US012110016B2

(12) United States Patent
Ahn

(10) Patent No.: US 12,110,016 B2
(45) Date of Patent: Oct. 8, 2024

(54) VEHICLE CAPABLE OF PREVENTING ROLLING ON NON-UNIFORM ROAD SURFCES AND CONTROL METHOD THEREOF

(71) Applicants: HYUNDAI MOTOR COMPANY, Seoul (KR); KIA CORPORATION, Seoul (KR)

(72) Inventor: Taeho Ahn, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 271 days.

(21) Appl. No.: 17/680,030

(22) Filed: Feb. 24, 2022

(65) Prior Publication Data

US 2022/0410885 A1 Dec. 29, 2022

(30) Foreign Application Priority Data

Jun. 23, 2021 (KR) ........................ 10-2021-0081298

(51) Int. Cl.
*B60W 30/12* (2020.01)

(52) U.S. Cl.
CPC ......... *B60W 30/12* (2013.01); *B60W 2520/10* (2013.01); *B60W 2520/105* (2013.01); *B60W 2520/14* (2013.01); *B60W 2552/30* (2020.02); *B60W 2552/35* (2020.02); *B60W 2720/10* (2013.01); *B60W 2720/106* (2013.01)

(58) Field of Classification Search
CPC ............. B60W 30/12; B60W 2552/35; B60W 2552/30; B60W 2520/10; B60W 2520/105; B60W 2520/14; B60W 2720/10; B60W 2720/106
See application file for complete search history.

(56) References Cited

U.S. PATENT DOCUMENTS

| | | | | |
|---|---|---|---|---|
| 2007/0225882 A1* | 9/2007 | Yamaguchi | B60W 50/14 | 701/45 |
| 2010/0023207 A1* | 1/2010 | Maeda | G07C 5/085 | 701/33.4 |
| 2019/0001965 A1* | 1/2019 | Cho | B60W 30/025 | |
| 2022/0242481 A1* | 8/2022 | Mizoguchi | B62D 15/025 | |

* cited by examiner

*Primary Examiner* — James J Lee
*Assistant Examiner* — Steven Vu Nguyen
(74) *Attorney, Agent, or Firm* — Lempia Summerfield Katz LLC

(57) ABSTRACT

A vehicle includes a navigation device, a sensor device, and a control device configured to identify an entry of the vehicle into a predetermined section of a road through the navigation device. In particular, the control device may identify at least one of a curvature of the road, a speed of the vehicle, or an acceleration of the vehicle through the sensor device in response to the entry of the vehicle into the predetermined section, and perform a lateral control of the vehicle based on at least one of the curvature of the road, the speed of the vehicle, or the acceleration of the vehicle.

13 Claims, 4 Drawing Sheets

FIG. 2

| | R=700 | 750 | 800 | ••• | 1000 |
|---|---|---|---|---|---|
| VEHICLE SPEED (km/h) V = 30 | $\alpha 1$ | $\alpha 2$ | $\alpha 3$ | ••• | |
| V = 50 | | | | | |
| ••• | | | | | |
| V = 140 | | | | | |

VEHICLE CAPABLE OF PREVENTING ROLLING ON NON-UNIFORM ROAD SURFCES AND CONTROL METHOD THEREOF

CROSS-REFERENCE TO RELATED APPLICATION(S)

This application claims priority to and the benefit of Korean Patent Application No. 10-2021-0081298, filed on Jun. 23, 2021, the disclosure of which is incorporated by reference herein in its entirety.

FIELD

The present disclosure relates to a vehicle and a control method thereof.

BACKGROUND

The statements in this section merely provide background information related to the present disclosure and may not constitute prior art.

The driving control of a vehicle includes a lane following assist (LFA) control and/or a lane keeping assistant (LKA) control, which are an autonomous lateral control of the vehicle.

The lane following assist control is a vehicle control method in which a vehicle performs steering control of the vehicle by identifying a lane and a preceding vehicle of the vehicle through a front camera of the vehicle or the like and generating a lateral travel path for maintaining a lane in which the vehicle is traveling and/or estimating the preceding vehicle.

The lane keeping assistant control is a vehicle control method in which a vehicle performs steering control of the vehicle to identify a lane and a road boundary through a front camera of the vehicle or the like, output a warning when the vehicle departs from a lane (i.e., a driving lane) in which the vehicle is traveling, and not to deviate the vehicle from the driving lane.

There may be a tining sections on a road. The tining section (also referred to as a tining road section) refers to a partial section of a road constructed by a tining method, which is a basic surface treatment method of concrete pavement.

In general, the tining section is constructed to form uniform unevenness and uniform unevenness intervals of a road surface, but in the case of a partial tining section, non-uniform unevenness and/or non-uniform unevenness intervals of a road surface are formed, so that the partial tining section may be constructed in a non-uniform road surface condition.

Accordingly, rolling, that is, a lateral vibration may occur in a vehicle traveling in a tining section of the non-uniform road surface condition, and a safety issue may arise along with performance degradation of vehicle driving control.

For example, when a vehicle traveling in a tining section with the non-uniform road surface condition performs a driving control such as the lane following assist control and/or the lane keeping assistant control, the driving control performance may be deteriorated.

SUMMARY

It is an aspect of the disclosure to provide a vehicle capable of preventing a rolling phenomenon of the vehicle traveling in a road section with a non-uniform road surface condition, for example, a tining section with the non-uniform road surface condition, that is, shaking of a vehicle body, and a control method thereof.

For example, the vehicle and the control method thereof may identify whether a road on which the vehicle is traveling is in a tining section with the non-uniform road surface condition, based on information of a navigation device and/or learning of lateral acceleration.

Further, the vehicle and the control method thereof may control the driving of the vehicle based on lateral control data optimized for a tining section with the non-uniform road surface condition when a road on which the vehicle is traveling is identified as the tinting section having the non-uniform road surface.

Accordingly, the vehicle and the control method thereof may improve the marketability and stability of the vehicle.

Additional aspects of the disclosure are set forth in part in the description which follows and, in part, should be obvious from the description, or may be learned by practice of the disclosure.

In accordance with an aspect of the disclosure, a vehicle includes a navigation device, a sensor device, and a control device configured to identify an entry of the vehicle into a predetermined section of a road through the navigation device, identify at least one of a curvature of the road, a speed of the vehicle, or an acceleration of the vehicle through the sensor device in response to the entry of the vehicle into the predetermined section, and perform a lateral control of the vehicle based on at least one of the curvature of the road, the speed of the vehicle, or the acceleration of the vehicle.

The predetermined section of the road may include a tining section of the road.

The control device may be configured to determine whether the vehicle is traveling in a road section with a non-uniform road surface condition based on at least one of the curvature of the road, the speed of the vehicle, or the acceleration of the vehicle, and perform a lateral control of the vehicle in response to determining that the vehicle is traveling in the road section with the non-uniform road surface condition.

The vehicle may further include a storage device configured to store reference accelerations corresponding to a plurality of reference curvatures and a plurality of reference speeds, respectively, wherein the control device may be configured to identify a first reference acceleration corresponding to the curvature of the road and the speed of the vehicle among the reference accelerations stored in the storage device, and determine that the vehicle is traveling in the road section with the non-uniform road surface condition based on the acceleration of the vehicle and the first reference acceleration.

The control device may be configured to determine that the vehicle is traveling in the road section with the non-uniform road surface condition when the acceleration of the vehicle is equal to or greater than a predetermined ratio of the first reference acceleration.

The lateral control of the vehicle may include a control of at least one of an angular velocity of the vehicle, a lane following assist of the vehicle, a yaw rate of the vehicle, a feedback angle gain of the vehicle, or a heading angle of the vehicle.

The control device may be configured to perform a longitudinal control of the vehicle based on at least one of the curvature of the road, the speed of the vehicle, or the acceleration of the vehicle.

The control device may be configured to identify at least one of the curvature of the road, the speed of the vehicle, or the acceleration of the vehicle, based on information obtained through the sensor device for a predetermined time.

The sensor device may include at least one of at least one camera, at least one radar, an acceleration sensor, or a speed sensor.

In accordance with an aspect of the disclosure, a control method of a vehicle includes: identifying an entry of the vehicle into a predetermined section of a road through a navigation device of the vehicle, identifying at least one of a curvature of the road, a speed of the vehicle, or an acceleration of the vehicle in response to the entry of the vehicle into the predetermined section, and performing a lateral control of the vehicle based on at least one of the curvature of the road, the speed of the vehicle, or the acceleration of the vehicle.

The predetermined section of the road may include a tining section of the road.

The performing of the lateral control of the vehicle may include determining whether the vehicle is traveling in a road section with a non-uniform road surface condition based on at least one of the curvature of the road, the speed of the vehicle, or the acceleration of the vehicle, and performing a lateral control of the vehicle in response to determining that the vehicle is traveling in the road section with the non-uniform road surface condition.

The determining of whether the vehicle is traveling in the road section with the non-uniform road surface condition may include: identifying a first reference acceleration corresponding to the curvature of the road and the speed of the vehicle among reference accelerations corresponding to a plurality of reference curvatures and a plurality of reference speeds, respectively, and determining that the vehicle is traveling in the road section with the non-uniform road surface condition based on the acceleration of the vehicle and the first reference acceleration.

The determining of whether the vehicle is traveling in the road section with the non-uniform road surface condition may include determining that the vehicle is traveling in the road section with the non-uniform road surface condition when the acceleration of the vehicle is equal to or greater than a predetermined ratio of the first reference acceleration.

The lateral control of the vehicle may include a control of at least one of an angular velocity of the vehicle, a lane following assist of the vehicle, a yaw rate of the vehicle, a feedback angle gain of the vehicle, or a heading angle of the vehicle.

The control method may further include performing a longitudinal control of the vehicle based on at least one of the curvature of the road, the speed of the vehicle, or the acceleration of the vehicle.

The identifying of at least one of the curvature of the road, the speed of the vehicle, and the acceleration of the vehicle may be performed based on information obtained through a sensor device for a predetermined time.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 2 is a table illustrating a reference lateral acceleration of the vehicle according to each reference curvature and each reference speed according to an embodiment;

Figure 1:
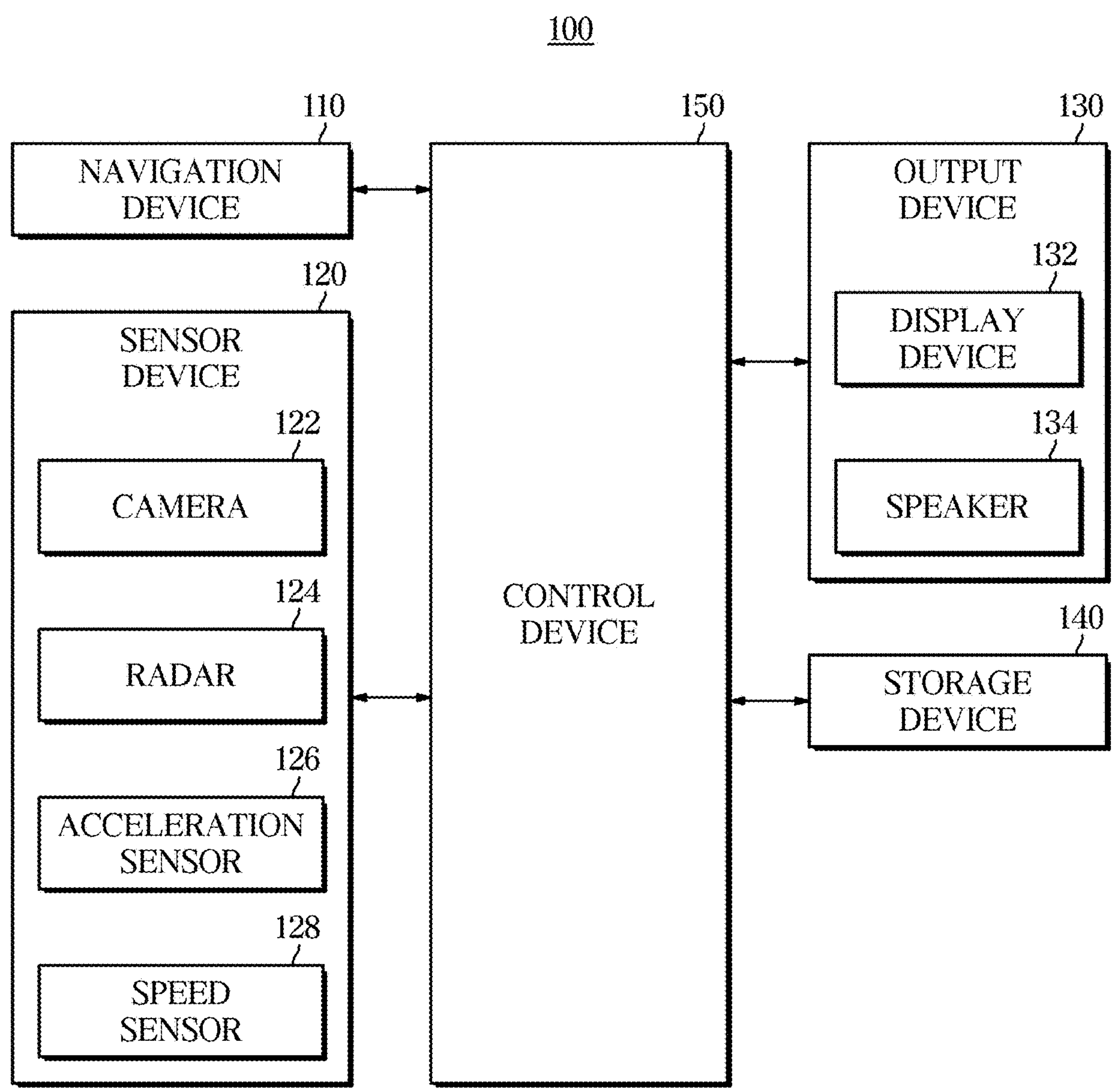
FIG. 1 is a block diagram of a vehicle according to an embodiment.

The drawings described herein are for illustration purposes only and are not intended to limit the scope of the present disclosure in any way.

DETAILED DESCRIPTION

Throughout the specification, like reference numerals refer to like elements. This specification does not describe all the elements of the embodiments, and duplicative contents between general contents or embodiments in the technical field of the disclosure are omitted. The terms 'part,' 'module,' 'member,' and 'block' used in this specification may be embodied as software or hardware (e.g., a processor), and it is also possible for a plurality of 'units,' 'modules,' 'members,' and 'blocks' to be embodied as one component, or one 'unit,' 'module,' 'member,' and 'block' to include a plurality of components according to embodiments.

When a component, device, element, or the like of the present disclosure is described as having a purpose or performing an operation, function, or the like, the component, device, or element should be considered herein as being "configured to" meet that purpose or to perform that operation or function.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

When a vehicle travels on a road, rolling may occur in the vehicle depending on a condition of the road on which the vehicle is traveling. The rolling refers to a lateral shaking of a vehicle body occurring on a road, that is, a road surface, and may be generated about a roll axis connecting a roll center of a rear wheel of a vehicle.

Rolling may occur in a vehicle when the vehicle travels in a tining section in which uniform unevenness and uniform unevenness intervals are formed, which is a partial section of a road constructed by a tining method, which is a basic surface treatment method of concrete pavement. In particular, the rolling may intensify when the vehicle travels in a tining section with a non-uniform road surface condition in which non-uniform unevenness and/or non-uniform unevenness intervals are formed.

For example, a phenomenon in which a vehicle travels irregularly in a straight line and/or curved form may occur when the vehicle travels in the tining section with the non-uniform road surface condition. Also, a phenomenon in which a vehicle repeatedly shakes left and/or right based on a straight travel path may occur when the vehicle travels in the tining section with the non-uniform road surface condition. Also, a phenomenon in which a steering angle of a vehicle deviates from a reference steering angle range may occur depending on a speed of the vehicle and/or a curvature of a road on which the vehicle is traveling when the vehicle travels in the tining section with the non-uniform road surface condition.

Accordingly, when a vehicle travels in the tining section with the non-uniform road surface condition, a safety issue may arise along with degradation of vehicle driving performance. For example, when a vehicle travels in the tining section with the non-uniform road surface condition during autonomous driving, a safety issue may arise along with performance degradation of autonomous driving control of the vehicle.

The disclosure may provide a new technology capable of reducing the occurrence of a safety issue along with deterioration of driving performance of a vehicle when the vehicle travels in a road section in which non-uniform unevenness and/or non-uniform unevenness intervals are formed, that is, in a tining section with a non-uniform road surface condition.

Hereinafter, the disclosure is described in detail with reference to the accompanying drawings.

FIG. 1 is a block diagram of a vehicle 100 according to an embodiment, and FIG. 2 is a table illustrating a reference lateral acceleration of the vehicle 100 according to each reference curvature and each reference speed according to an embodiment.

The vehicle 100 may include a navigation device 110, a sensor device 120, an output device 130, a storage device 140, and/or a control device 150.

The navigation device 110 may output navigation information. The navigation information may include route information that provides a route to a destination input from a driver of the vehicle 100.

The navigation device 110 may identify location information of the vehicle 100, driving environment information, and the like by matching location coordinates of the vehicle 100 identified through a satellite signal on a map previously stored in a memory, thereby generating route information. For example, the navigation device 110 may include a global positioning system (GPS) to receive the satellite signal propagated from a GPS satellite through the GPS. The satellite signal may include the location coordinates of the vehicle 100.

The navigation device 110 may receive and output a signal indicating a predetermined section of a road on which the vehicle 100 is traveling.

For example, the predetermined section may include a tining section in which unevenness is formed on a surface of a road.

For example, an organization that provides navigation information (e.g., Korea Expressway Corporation) may identify predetermined sections in which unevenness is formed on a surface of a road, for example, a tining sections, create a database of the tining sections as navigation information, that is, route information, and provide (or transmit) the database to the navigation device 110 of the vehicle 100 through a management server.

The sensor device 120 may be located inside and/or outside the vehicle 100, and may be used to obtain at least one piece of information inside and/or outside the vehicle 100.

The sensor device 120 may include a camera 122, a radar 124, an acceleration sensor 126, and/or a speed sensor 128.

A plurality of the cameras 122 may be provided and mounted on a front, rear, left, and/or right side of the vehicle 100. For example, the camera 122 may obtain an image (also referred to as a moving picture) corresponding to a direction such as the front, rear, and/or sides (a left direction and/or a right direction).

For example, the camera 122 may obtain (also referred to as photographing) an image around the vehicle 100 based on control of the control device 150. The control device 150 may identify a front vehicle, a pedestrian and/or a bicycle occupant located in front of the vehicle 100, that is, identify a position and shape of an object, based on the image obtained through the camera 122, and identify information (e.g., lane information, etc.) of a road on which the vehicle 100 is traveling.

A plurality of the radars 124 may be provided and mounted on the front, rear, left, and/or right side of the vehicle 100. The radar 124 may receive an echo of an electromagnetic wave reflected from a surface of the object by emitting the electromagnetic wave to identify a distance to the object and/or a direction of the object. For example, the radar 124 may be used to detect an object located in the vicinity of the vehicle 100.

For example, the control device 150 may identify a fixed object and/or a moving object around the vehicle 100 based on output information of the radar 124. The control device 150 may identify a front vehicle, a pedestrian, and/or a bicycle occupant located in front of the vehicle 100, that is, identify a distance to the object, a relative speed of the object, and the like, based on the output information of the radar 124.

The acceleration sensor 126 may measure (also referred to as identification) an acceleration of the vehicle 100. For example, the acceleration sensor 126 may include a lateral acceleration sensor to measure a speed change of the vehicle 100 in a lateral direction, that is, a lateral acceleration.

The speed sensor 128 may measure (also referred to as identification) a driving speed of the vehicle 100.

The output device 130 may include a display device 132 and/or a speaker 134, and the like.

The display device 132 may display, for example, various contents (e.g., text, image, video, icon, and/or symbol, etc.). The display device 132 may include a touch screen and receive, for example, a touch, gesture, proximity, or hovering input using a part of a body of a user.

The display device 132 may visually output at least one operation state of the vehicle 100, for example, an operation state of a lane following assist control, based on control of the control device 150.

One or a plurality of the speakers 134 may be provided and may output a sound signal.

The speaker 134 may output a sound signal to provide an audible notification when the control device 150 performs control, for example, a lane keeping assistant control.

The storage device 140 may store various data used by at least one component of the vehicle 100, for example, input data or output data for a software program and related commands. The storage device 140 may include a volatile memory and/or a non-volatile memory.

The storage device 140 may store a reference acceleration corresponding to each of a plurality of the reference curvatures and each of a plurality of reference speeds. The reference acceleration may include a reference lateral acceleration.

For example, as illustrated in FIG. 2, the storage device 140 may store the reference lateral accelerations (Y-axis accelerations; α1, α2, α3, etc.) of the vehicle 100 corresponding to each of the reference curvatures (R=700, 750, 800 . . . 1000) and each of the reference speeds (also referred to as vehicle speed) (V=30, 50, . . . 140).

The control device 150 (also referred to as a control circuit or processor) may control at least one other component (e.g., a hardware component or a software component (software program)) of the connected vehicle 100, and may perform various data processing and calculations.

The control device 150 may include an electronic control unit (ECU) to control a power system of the vehicle 100. The control device 150 may include a processor and a memory.

The control device 150 may include, for example, an antilock brake system (ABS), an electronic stability control system (ESC System), a motor driven power steering system (MDPS System) and/or an advanced driver assist system (ADAS), and the like.

The control device 150 may control autonomous driving of the vehicle 100 including the lane following assist (LFA) control and/or the lane keeping assistant (LKA) control of the vehicle 100.

The lane following assist control may include: maintaining a lane on a road on which the vehicle 100 is traveling, generating a lateral travel path for estimating a front vehicle, and/or controlling steering of the vehicle 100. For example, the control device 150 may identify information such as a lane and a vehicle in front of the vehicle 100 through the sensor device 120, and may perform the lane following assist control based thereon.

The lane keeping assistant control may include a control of the output device 130 to output a warning when the vehicle 100 deviates from a lane in which the vehicle 100 is traveling and/or a steering control to steer not to deviate from the lane in which the vehicle 100 is traveling.

The control device 150 may identify information such as a relative distance and/or relative speed with respect to a vehicle in front of the vehicle 10 based on the output information of the sensor device 120.

The control device 150 may control a lateral torque of the vehicle 100 based on the output information of the navigation device 110 and/or the sensor device 120.

The control device 150 may identify an entry of the vehicle 100 into the predetermined section of a road through the navigation device 110, for example, a tining section in which uniform unevenness and uniform unevenness intervals are formed on a road surface. The control device 150 may identify a curvature of the road, a speed of the vehicle 100 and/or an acceleration of the vehicle 100 based on the information obtained through the sensor device 120 in response to the entry of the vehicle 100 into the predetermined section. The control device 150 may perform a lateral control (also referred to as lateral driving control) of the vehicle 100 based on the curvature of the road, the speed of the vehicle 100 and/or the acceleration of the vehicle 100.

For example, the control device 150, based on the curvature of the road, the speed of the vehicle 100 and/or the acceleration of the vehicle 100, may identify whether the vehicle 100 travels (also referred to as entry) into a road section with a non-uniform road surface condition, for example, a tining section with the non-uniform road surface condition in which non-uniform unevenness and/or non-uniform unevenness intervals are formed on a road surface. The control device 150 may perform the lateral control in response to identification of the traveling to the tining section with the non-uniform road surface condition in which the non-uniform unevenness and/or the non-uniform unevenness intervals are formed on the road surface.

For example, the lateral control of the vehicle 100 may include lateral torque control of a steering device (not shown) of the vehicle 100.

For example, the lateral control of the vehicle 100 may include an angular velocity control of the vehicle 100, the lane following assist control of the vehicle 100, a yaw rate control of the vehicle 100, a feedback angle gain control of the vehicle 100, and/or a heading angle control of the vehicle 100.

The control device 150 may perform a longitudinal control (also referred to as longitudinal driving control) of the vehicle 100 based on the curvature of the road, the speed of the vehicle 100 and/or the acceleration of the vehicle 100.

Although not shown in FIG. 1, the vehicle 100 may further include the steering device (not shown) provided to change a driving direction of the vehicle 100 according to steering control of the driver and/or the control device 150 and including a steering wheel, a steering gear and/or a steering link.

Also, although not shown in FIG. 1, the vehicle 100 may further include a braking device (not shown) provided to stop the driving of the vehicle 100 according to braking control of the driver and/or control of the control device 150 and including a master cylinder, a brake disc, a brake pad, and a brake pedal.

The navigation device 110 and/or the display device 132 described above may be included in an audio video navigation (AVN) device (not shown) of the vehicle 100. The AVN device may refer to a multimedia device in which audio, video, navigation, and/or telematics terminals are integrated into one. The AVN device may be provided on the center fascia of the vehicle 100, but is not limited thereto.

Figure 3:
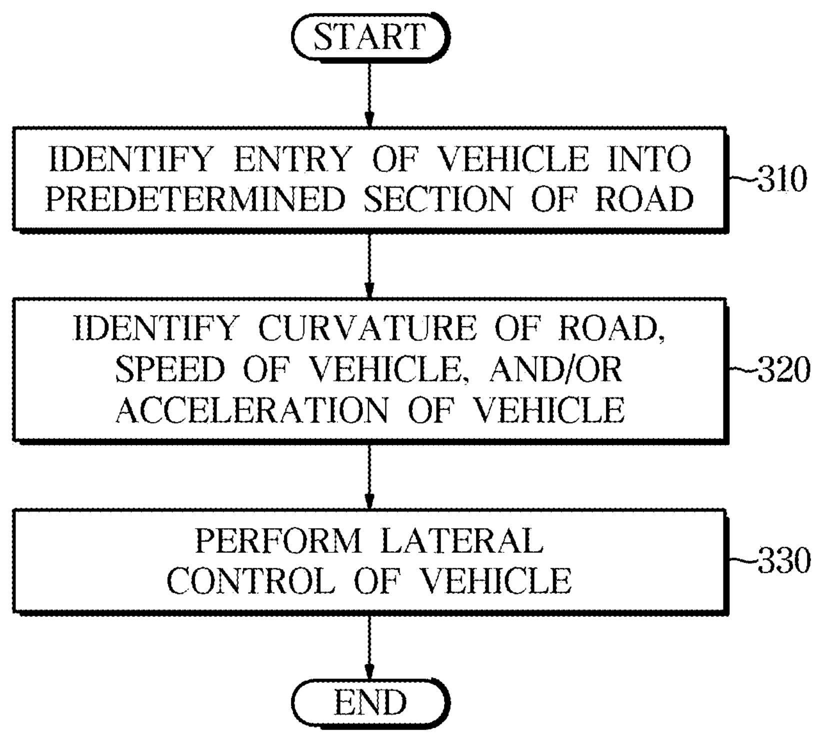
FIG. 3 is a flowchart of an operation of the vehicle according to an embodiment.

FIG. 3 is a flowchart of an operation of the vehicle 100 (the control device 150 of the vehicle 100) according to an embodiment.

The vehicle 100 may identify an entry of the vehicle 100 into the predetermined section of a road through the navigation device 110 of the vehicle 100 (Step 310).

The vehicle 100 may identify location information of the predetermined section included in a road on which the vehicle 100 is traveling through the navigation device 110 of the vehicle 100, and may identify the entry of the vehicle 100 into the predetermined section of the road based on the location information of the predetermined section.

The predetermined section of the road may include a tining section, and the tining section may include a tining section with a uniform road surface condition including uniform unevenness and uniform unevenness intervals, and a tining section with a non-uniform road surface condition including non-uniform unevenness and/or non-uniform unevenness intervals.

The vehicle 100 may identify the curvature of the road, the speed of the vehicle 100 and/or the acceleration of the vehicle 100 through the sensor device 120 in response to the entry of the vehicle 100 into the predetermined section (Step 320).

The vehicle 100 may identify the curvature of the road, the speed of the vehicle 100 and/or the acceleration of the vehicle 100 based on the information obtained through the sensor device 120 for a predetermined time.

The vehicle 100 may perform the lateral control of the vehicle 100 based on the curvature of the road, the speed of the vehicle 100 and/or the acceleration of the vehicle 100 (Step 330).

The vehicle 100 may, based on at least one of the curvature of the road, the speed of the vehicle 100, and the acceleration of the vehicle 100, determine whether the vehicle 100 is traveling in a road section with the non-uniform road surface condition, and perform the lateral control of the vehicle 100 in response to determining that the vehicle 100 is traveling in the road section with the non-uniform road surface condition.

The vehicle 100 may identify a first reference acceleration corresponding to a curvature of a road on which the vehicle 100 is traveling and a speed of the vehicle 100 among the reference accelerations corresponding to the plurality of reference curvatures and the plurality of reference speeds stored in the storage device 140, respectively. The vehicle 100 may determine that the vehicle 100 is traveling in the road section with the non-uniform road surface condition (or entering the road section with the non-uniform road surface condition) based on the acceleration of the vehicle 100 and the first reference acceleration.

For example, the vehicle 100 may determine that the vehicle 100 is traveling in the road section with the non-uniform road surface condition based on the acceleration of the vehicle 100 being equal to or greater than a predetermined ratio of the first reference acceleration.

The lateral driving control of the vehicle 100 includes an angular velocity of the vehicle 100, lane following assist of the vehicle 100, a yaw rate of the vehicle 100, a feedback angle gain of the vehicle 100 and/or control of a heading angle of the vehicle 100.

In addition to the embodiment described above with reference to FIG. 3, the vehicle 100 may perform the longitudinal control of the vehicle 100 based on the curvature of the road, the speed of the vehicle 100 and/or the acceleration of the vehicle 100.

Figure 4:
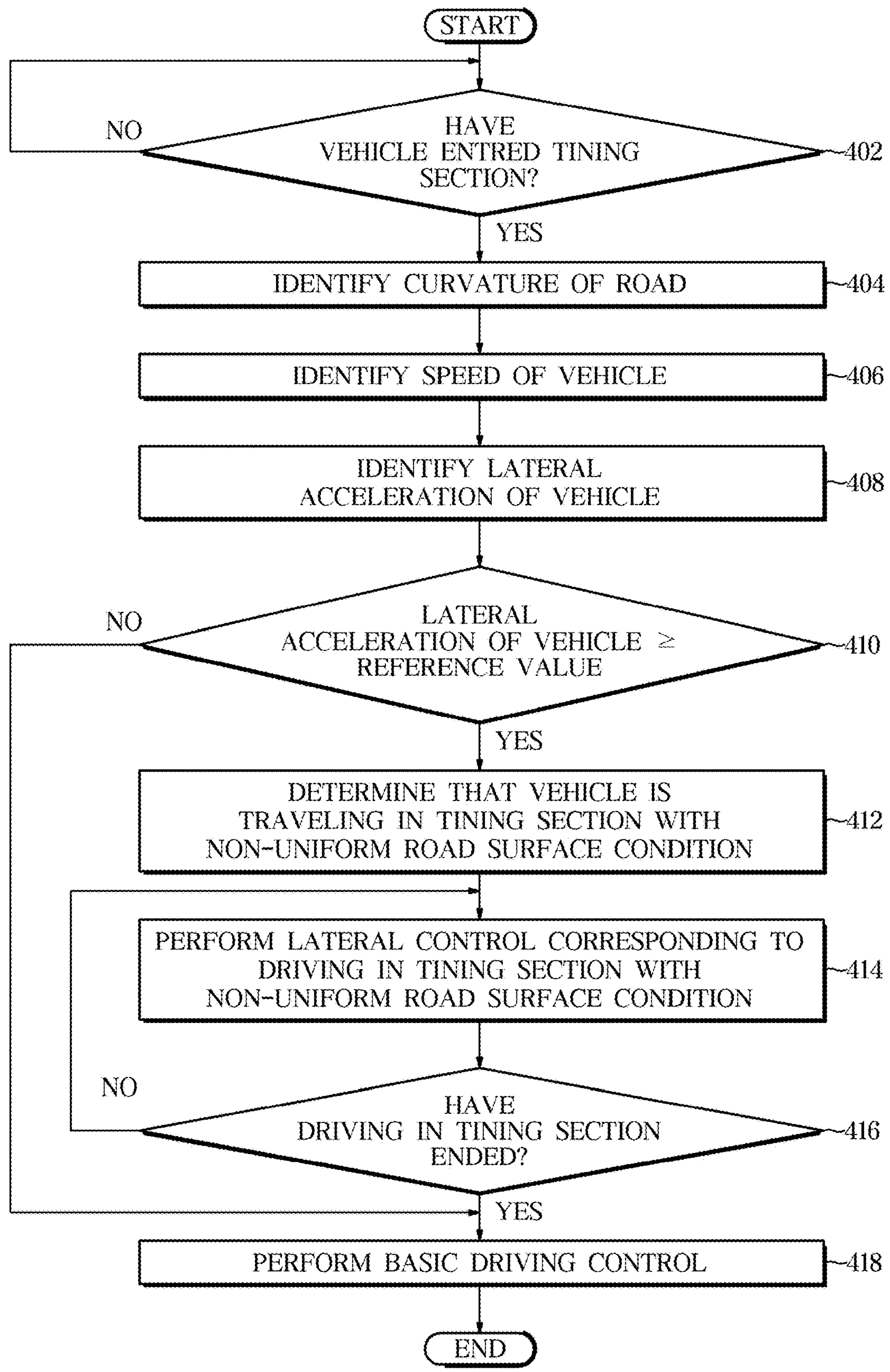
FIG. 4 is a flowchart of an operation of the vehicle according to an embodiment.

FIG. 4 is a flowchart of an operation of the vehicle 100 (the control device 150 of the vehicle 100) according to an embodiment.

The vehicle 100 may identify whether the vehicle 100 has entered a tining section (Step 402).

The vehicle 100 may identify whether the vehicle 100 has entered the tining section based on the information obtained through the navigation device 110 while driving.

The vehicle 100 may perform operation of Step 404 when entering the tining section, otherwise may perform operation of Step 402.

The vehicle 100 may identify a curvature of a road on which the vehicle 100 is traveling based on the information obtained through the sensor device 120 (Step 404).

A method of identifying the curvature of a road is a prior art and a detailed description thereof is omitted.

The vehicle 100 may identify a speed of the vehicle 100 (Step 406).

The vehicle 100 may identify a lateral acceleration of the vehicle 100 (Step 408).

The vehicle 100 may identify whether the lateral acceleration of the vehicle 100 is equal to or greater than a reference value (Step 410).

The reference value may be determined by multiplying the reference acceleration corresponding to the curvature of the road and the speed of the vehicle 100 by a predetermined value (e.g., 1.1).

This is to prevent erroneous control of the vehicle 100 due to an erroneous determination of a tining section of a non-uniform road surface condition, and may be for determining that the vehicle 100 is traveling in a tining section with a non-uniform road surface condition when the vehicle 100 is actually driving in the tining section with the non-uniform road surface condition and when the lateral acceleration of the vehicle 100 and the predetermined reference acceleration are equal to or greater than a certain ratio.

For example, the vehicle 100 may identify a first reference curvature corresponding to the curvature of the road (including the curvature of the road) among the reference curvatures "R" in FIG. 2, and may identify a first reference speed corresponding to the speed of the vehicle 100 (including the speed of the vehicle 100) among the reference speeds "V" in FIG. 2.

The vehicle 100 may identify a first reference lateral acceleration corresponding to the first reference curvature and the first reference speed from among the reference lateral accelerations in FIG. 2.

The vehicle 100 may determine the reference value by multiplying the first reference lateral acceleration by the predetermined value, for example, 1.1, and may compare the lateral acceleration of the vehicle 100 with the reference value.

The vehicle 100 may perform operation of Step 412 when the lateral acceleration of the vehicle 100 is equal to or greater than the reference value, and otherwise may perform operation of Step 418.

The vehicle 100 may determine that the vehicle 100 is traveling in a tining section with the non-uniform road surface condition (Step 412).

The vehicle 100 may perform a lateral control corresponding to the driving in the tining section of the non-uniform road surface condition (Step 414).

When performing the lateral control corresponding to the driving in the tining section of the non-uniform road surface condition, the vehicle 100 may prevent a rapid transition of data values for the lateral control of the vehicle 100 by using a filter for control stability.

The lateral control corresponding to the driving in the tining section of the non-uniform road surface condition may include the control of the angular velocity of the vehicle 100, the lane following assist of the vehicle 100, the yaw rate of the vehicle 100, the feedback angle gain of the vehicle 100, and/or the heading angle of the vehicle 100.

For example, the lateral control corresponding to the driving in the tining section of the non-uniform road surface condition may include a control of increasing an angular velocity damping value of the vehicle 100, compared with a driving control of a pre-designated lateral control method in a basic driving control of the vehicle 100.

Also, the lateral control corresponding to the driving in the tining section of the non-uniform road surface condition may include a control of decreasing a gain value in the lane following assist control of the vehicle 100, compared with the driving control of the pre-designated lateral control method of the vehicle 100.

Also, the lateral control corresponding to the driving in the tining section of the non-uniform road surface condition may include a control of decreasing a feedback angle gain value of the vehicle 100, compared with the driving control of the pre-designated lateral control method of the vehicle 100.

Also, the lateral control corresponding to the driving in the tining section of the non-uniform road surface condition may include a control of reducing a slope of feedback error data of the yaw rate, compared with the driving control of the pre-designated lateral control method of the vehicle 100.

Also, the lateral control corresponding to the driving in the tining section of the non-uniform road surface condition may include a control of reducing a slope of feedback error data of the heading angle, compared with the driving control of the pre-designated lateral control method of the vehicle 100.

The vehicle 100 may identify whether the driving in the tining section has ended (Step 416).

The vehicle 100 may identify whether the driving in the tining section has ended, that is, the vehicle 100 has deviated from the tining section, based on the information obtained through the navigation device 110.

The vehicle 100 may perform operation of Step 418 when it is identified that the end of the driving in the tining section is identified, and otherwise may perform operation of Step 414.

The vehicle 100 may perform the basic driving control of the vehicle 100 (Step 418).

The basic driving control may include the driving control of the pre-designated lateral control method.

When performing a control operation to change to the basic driving control from the lateral control corresponding to the driving in the tining section of the non-uniform road surface condition, the vehicle 100 may prevent a rapid transition of data values for a control of the vehicle 100 by using the filter for control stability.

As an addition of the above-described embodiment, in order to enhance the driving stability of the vehicle 100, the vehicle 100 may additionally perform a longitudinal control to increase a distance to a vehicle in front of the vehicle 100 based on the information obtained through the sensor device 120 when performing the lateral control corresponding to the driving in the tining section of the non-uniform road surface condition as described above.

Operations of steps 404 to 408 in the above-described embodiment may be performed for a predetermined time after the vehicle 100 enters the tining section, and may be referred to as learning operations for the vehicle 100 to obtain additional information on the tining section.

According to the above-described embodiments, the vehicle 100 may identify the entry of the predetermined section of a road by receiving information on the predetermined section in which unevenness is formed on the road on which the vehicle 100 is traveling, for example, information on the tining section through the navigation device 110 of the vehicle 100. Also, the vehicle 100 may identify (also referred to as learning) the road section with the non-uniform road surface condition, for example, the tining section with the non-uniform road surface condition, in the predetermined section while driving the predetermined section. Also, the vehicle 100 may perform the driving control of the vehicle differently from an existing driving when traveling in the road section with the non-uniform road surface condition. For example, the vehicle 100 may perform the longitudinal control and the lateral control by dualizing the driving control of the vehicle.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (read-only memory), a RAM (random access memory), a magnetic tape, a magnetic disk, a flash memory, an optical data storage device, and the like.

As is apparent from the above, a vehicle and a control method thereof according to an aspect of the disclosure can control driving of the vehicle based on information of a navigation device and learning of lateral acceleration.

For example, the vehicle and the control method thereof can determine whether the vehicle is traveling in a tining section with a non-uniform road surface condition based on information of a navigation device and learning of lateral acceleration.

Further, the vehicle and the control method thereof can minimize a rolling phenomenon that may occur in the vehicle through driving control data of the vehicle optimized for a tining section of a non-uniform road surface condition, that is, lateral control data, when it is determined that the vehicle is traveling in the tinting section with the non-uniform road surface condition.

Therefore, the vehicle and the control method thereof can improve the marketability and stability of the vehicle without adding many devices (hardware and/or software devices) to the vehicle.

The embodiments disclosed with reference to the accompanying drawings have been described above. However, it should be understood by those having ordinary skill in the art that various changes in form and details may be made therein without departing from the spirit and scope of the disclosure. The disclosed embodiments are illustrative and should not be construed as limiting.

What is claimed is:

1. A vehicle comprising:
a navigation device;
a sensor device; and
a processor configured to:
identify an entry of the vehicle into a tining section of a road through the navigation device,
identify a curvature of the road, a speed of the vehicle, and an acceleration of the vehicle through the sensor device in response to the entry of the vehicle into the tining section,
determine whether the vehicle is traveling in i) a first tining section including uniform unevenness and uniform unevenness intervals or ii) a second tining section including at least one of non-uniform unevenness and non-uniform unevenness intervals, based on the curvature of the road, the speed of the vehicle, and the acceleration of the vehicle, and
perform a lateral control of the vehicle corresponding to the second tining section based on the determination that the vehicle is travelling in the second tining section, wherein the lateral control of the vehicle comprises a control of increasing an angular velocity damping value of the vehicle.

2. The vehicle according to claim 1, further comprising:
a memory configured to store reference accelerations corresponding to a plurality of reference curvatures and a plurality of reference speeds, respectively,
wherein the processor is further configured to:
identify a first reference acceleration corresponding to the curvature of the road and the speed of the vehicle among the reference accelerations stored in the memory, and
determine that the vehicle is traveling in the second tining section based on the acceleration of the vehicle and the first reference acceleration.

3. The vehicle according to claim 2, wherein the processor is further configured to determine that the vehicle is traveling in the second tining section when the acceleration of the vehicle is equal to or greater than a predetermined ratio of the first reference acceleration.

4. The vehicle according to claim 1, wherein the lateral control of the vehicle comprises a control of at least one of an angular velocity of the vehicle, a lane following assist of the vehicle, a yaw rate of the vehicle, a feedback angle gain of the vehicle, or a heading angle of the vehicle.

5. The vehicle according to claim 1, wherein the processor is configured to perform a longitudinal control of the vehicle based on at least one of the curvature of the road, the speed of the vehicle, or the acceleration of the vehicle.

6. The vehicle according to claim 1, wherein the processor is further configured to identify at least one of the curvature of the road, the speed of the vehicle, or the acceleration of the vehicle, based on information obtained through the sensor device for a predetermined time.

7. The vehicle according to claim 1, wherein the sensor device comprises at least one of at least one camera, at least one radar, an acceleration sensor, or a speed sensor.

8. A control method of a vehicle, comprising:

identifying an entry of the vehicle into a tining section of a road through a navigation device of the vehicle;

identifying a curvature of the road, a speed of the vehicle, and an acceleration of the vehicle in response to the entry of the vehicle into the tining section;

determining whether the vehicle is traveling in i) a first tining section including uniform unevenness and uniform unevenness intervals or ii) a second tining section including at least one of non-uniform unevenness and non-uniform unevenness intervals, based on the curvature of the road, the speed of the vehicle, and the acceleration of the vehicle; and performing a lateral control of the vehicle corresponding to the second tining section, based on the determination that the vehicle is travelling in the second tining section, wherein the lateral control of the vehicle comprises a control of increasing an angular velocity damping value of the vehicle.

9. The control method according to claim 8, wherein the determining of whether the vehicle is traveling in the second tining section comprises:

identifying a first reference acceleration corresponding to the curvature of the road and the speed of the vehicle among reference accelerations corresponding to a plurality of reference curvatures and a plurality of reference speeds, respectively; and determining that the vehicle is traveling in the second tining section based on the acceleration of the vehicle and the first reference acceleration.

10. The control method according to claim 9, wherein the determining of whether the vehicle is traveling in the second tining section comprises determining that the vehicle is traveling in the second tining section when the acceleration of the vehicle is equal to or greater than a predetermined ratio of the first reference acceleration.

11. The control method according to claim 8, wherein the lateral control of the vehicle comprises a control of at least one of an angular velocity of the vehicle, a lane following assist of the vehicle, a yaw rate of the vehicle, a feedback angle gain of the vehicle, or a heading angle of the vehicle.

12. The control method according to claim 8, further comprising: performing a longitudinal control of the vehicle based on at least one of the curvature of the road, the speed of the vehicle, or the acceleration of the vehicle.

13. The control method according to claim 8, wherein the identifying of at least one of the curvature of the road, the speed of the vehicle, or the acceleration of the vehicle is performed based on information obtained through a sensor device for a predetermined time.

* * * * *